US008819295B2

(12) United States Patent
Ushiyama

(10) Patent No.: US 8,819,295 B2
(45) Date of Patent: Aug. 26, 2014

(54) INFORMATION COMMUNICATION SYSTEM, FIRST INFORMATION PROCESSING DEVICE, METHOD FOR PROCESSING INFORMATION, AND COMPUTER READABLE STORAGE MEDIUM

(75) Inventor: Kentaro Ushiyama, Nagoya (JP)

(73) Assignee: Brother Kogyo Kabushiki Kaisha, Nagoya-Shi, Aichi-Ken, (JP)

( * ) Notice: Subject to any disclaimer, the term of this patent is extended or adjusted under 35 U.S.C. 154(b) by 594 days.

(21) Appl. No.: 13/074,493

(22) Filed: Mar. 29, 2011

(65) Prior Publication Data

US 2011/0246674 A1  Oct. 6, 2011

(30) Foreign Application Priority Data

Mar. 30, 2010  (JP) ................ 2010-078052

(51) Int. Cl.
*G06F 15/16*  (2006.01)
(52) U.S. Cl.
USPC ........... 709/250; 709/220; 709/221; 709/222; 709/223
(58) Field of Classification Search
None
See application file for complete search history.

(56) References Cited

U.S. PATENT DOCUMENTS

| 2005/0195755 | A1 | 9/2005 | Senta et al. | |
|---|---|---|---|---|
| 2006/0203837 | A1* | 9/2006 | Shvodian | 370/445 |
| 2007/0076698 | A1* | 4/2007 | Matsumoto | 370/352 |
| 2007/0283043 | A1 | 12/2007 | Kiyohara et al. | |
| 2009/0003244 | A1 | 1/2009 | Matsuo | |
| 2010/0161817 | A1* | 6/2010 | Xiao et al. | 709/229 |
| 2011/0010458 | A1* | 1/2011 | Das et al. | 709/227 |
| 2011/0047380 | A1* | 2/2011 | Miller | 713/168 |
| 2011/0252122 | A1* | 10/2011 | Takeda et al. | 709/223 |

FOREIGN PATENT DOCUMENTS

| JP | 2006197400 | 7/2006 |
|---|---|---|
| JP | 2007-097044 A | 4/2007 |
| JP | 2007-288307 A | 11/2007 |
| JP | 2009-135869 A | 6/2009 |
| WO | 2004030273 | 4/2004 |

OTHER PUBLICATIONS

Japanese Office Action of JP 2010-078052 dated Jul. 24, 2012.

* cited by examiner

*Primary Examiner* — Djenane Bayard
(74) *Attorney, Agent, or Firm* — McCarter & English, LLP

(57) ABSTRACT

A first information processing device configures an information communication system for communicating information through a plurality of overlay networks comprising a plurality of node devices connected to a network, the first information processing device that comprises an acquisition unit configured to acquire range information indicative of a range of the network of the request node device, a generation unit configured to generate identification information indicative of identifying a group to which the request node has transmitted the request message is belonged, based on the range information, and a control unit configured to control the request node device to join-in the overlay network corresponding to the range information.

13 Claims, 11 Drawing Sheets

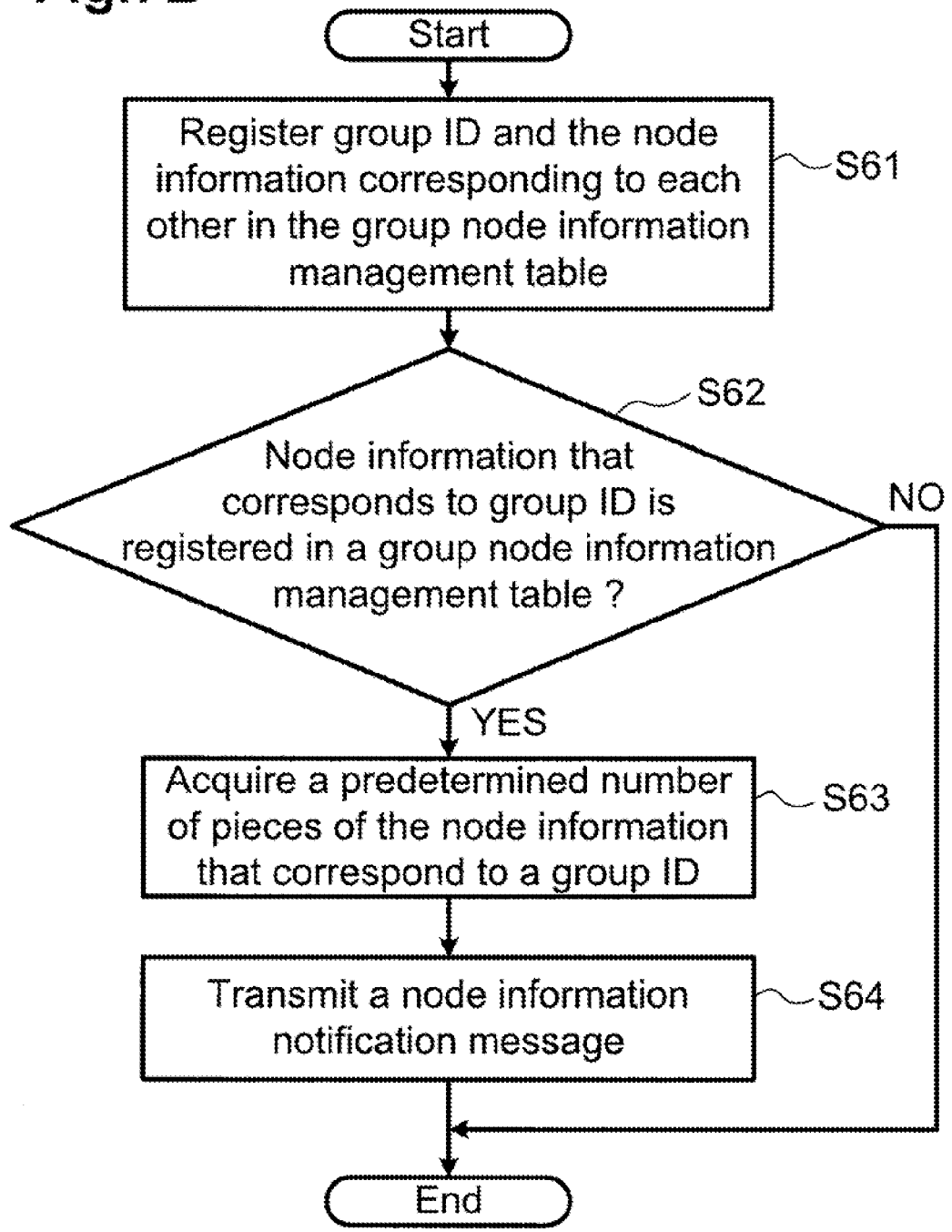

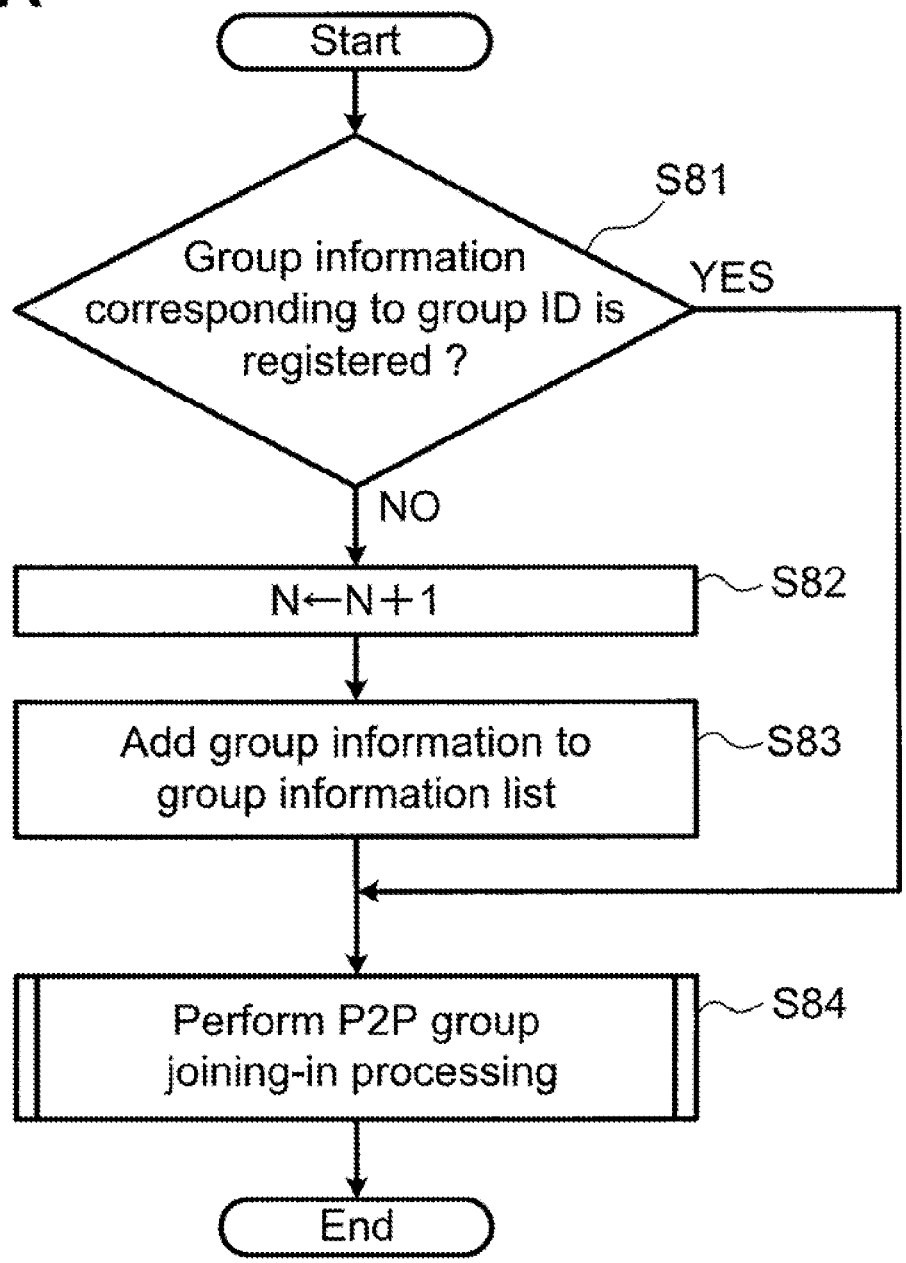

US 8,819,295 B2

INFORMATION COMMUNICATION SYSTEM, FIRST INFORMATION PROCESSING DEVICE, METHOD FOR PROCESSING INFORMATION, AND COMPUTER READABLE STORAGE MEDIUM

CROSS REFERENCE TO RELATED APPLICATION

This application claims priority from Japanese Patent Application No. 2010-078052 filed on Mar. 30, 2010, the entire contents of which are incorporated herein by reference.

BACKGROUND OF THE INVENTION

1. Field of the Invention

The present invention relates to the technological field of an overlay network system. A peer to peer communication system is one example of an overlay network system. The peer-to-peer communication system includes a plurality of node devices that can communicate with each other through a network.

2. Description of the Related Art

Recently, attention has been drawn to the peer-to-peer communication system. Specifically, by conventional technologies, a plurality of node devices are subdivided into groups based on a distance between the node devices on the network. Accordingly, when a pre-determined one of the node devices sends or relays information, it will transmit the information to the node device representative of each of the groups.

In a peer-to-peer communication system, an overlay network is built on a physical network. The overlay network is a logical network. The physical network may in some cases be configured by interconnecting a plurality of networks. The plurality of networks may be, for example, local area networks (LANs) or access networks. However, such circumstances would not be taken into account in grouping by the conventional technologies. Therefore, there are some cases, for example, where the node devices may communicate with each other through different networks although they can communicate with each other in the same network. In such a case, there is a high possibility that information transmitted from the node device may pass through a communication line that interconnects the networks. In this case, when the communication line has a small bandwidth, sometimes the information may not be transmitted or received sufficiently between the networks.

SUMMARY OF THE INVENTION

Aspects of the invention provide an information communication system for communicating information through a plurality of overlay networks comprising a plurality of node devices connected to a network, the information communication system comprising a first information processing device that comprises, a first reception unit that receives a request message indicative of requesting information for joining in at least one of the plurality of the overlay networks from a request node device that requests to join-in at least one of the plurality of the overlay network, an acquisition unit configured to acquire range information indicative of a range of the network of the request node device, a generation unit configured to generate identification information indicative of identifying a group to which the request node that has transmitted the request message belongs, based on the range information, and a control unit configured to control the request node device to join-in the overlay network corresponding to the range information.

Aspects of the invention provide a first information processing device that configures an information communication system for communicating information through a plurality of overlay networks comprising a plurality of node devices connected to a network, the first information processing device that comprises a first reception unit that receives a request message indicative of requesting information for participating at least one of the plurality of the overlay networks from a request node device that requests to join-in at least one of the plurality of the overlay network, an acquisition unit configured to acquire range information indicative of a range of the network of the request node device, a generation unit configured to generate identification information indicative of identifying a group to which the request node has transmitted the request message belongs, based on the range information, and a control unit configured to control the request node device to join-in the overlay network corresponding to the range information.

Aspects of the invention provide a method for processing information in an information communication system for communicating information through a plurality of overlay networks comprising a plurality of node devices connected to a network, the information communication system, a request node device that requests to join-in at least one of the plurality of the overlay network, the method comprises receiving a request message indicative of requesting information for participating in at least one of the plurality of overlay networks from a request node device that requests to join-in at least one of the plurality of the overlay network, acquiring range information indicative of a range of the network of the request node device, generating identification information indicative of identifying a group to which the request node has transmitted the request message belongs based on the range information, and a controlling the request node device to join-in the overlay network corresponding to the range information.

Aspects of the invention provide a non-transitory computer readable storage medium storing a program that causes a computer included a first information processing device in the information communication system to communicate information through a plurality of overlay networks comprising a plurality of node devices connected to a network, to execute the steps of receiving a request message indicative of requesting information for participating at least one of the plurality of the overlay networks from a request node device that requests to join-in at least one of the plurality of the overlay network, acquiring range information indicative of a range of the network of the request node device, generating identification information indicative of identifying a group to which the request node has transmitted the request message belongs based on the range information, and a controlling the request node device to join-in the overlay network corresponding to the range information.

BRIEF DESCRIPTION OF THE DRAWINGS

FIG. 7B is a flowchart showing a processing example in processing to receive a contact node request message from the node;

FIG. 8A is a flowchart showing a processing example in processing to receive a group information notification message from the node.

DESCRIPTION OF THE PREFERRED EMBODIMENTS

Embodiments of the present invention will be described below with reference to the drawings. It is to be noted that the following embodiments are based on the assumption that the present invention is applied to a content distributed storage system.

[1. Configuration of the Content Distributed Storage System]

Figure 1:
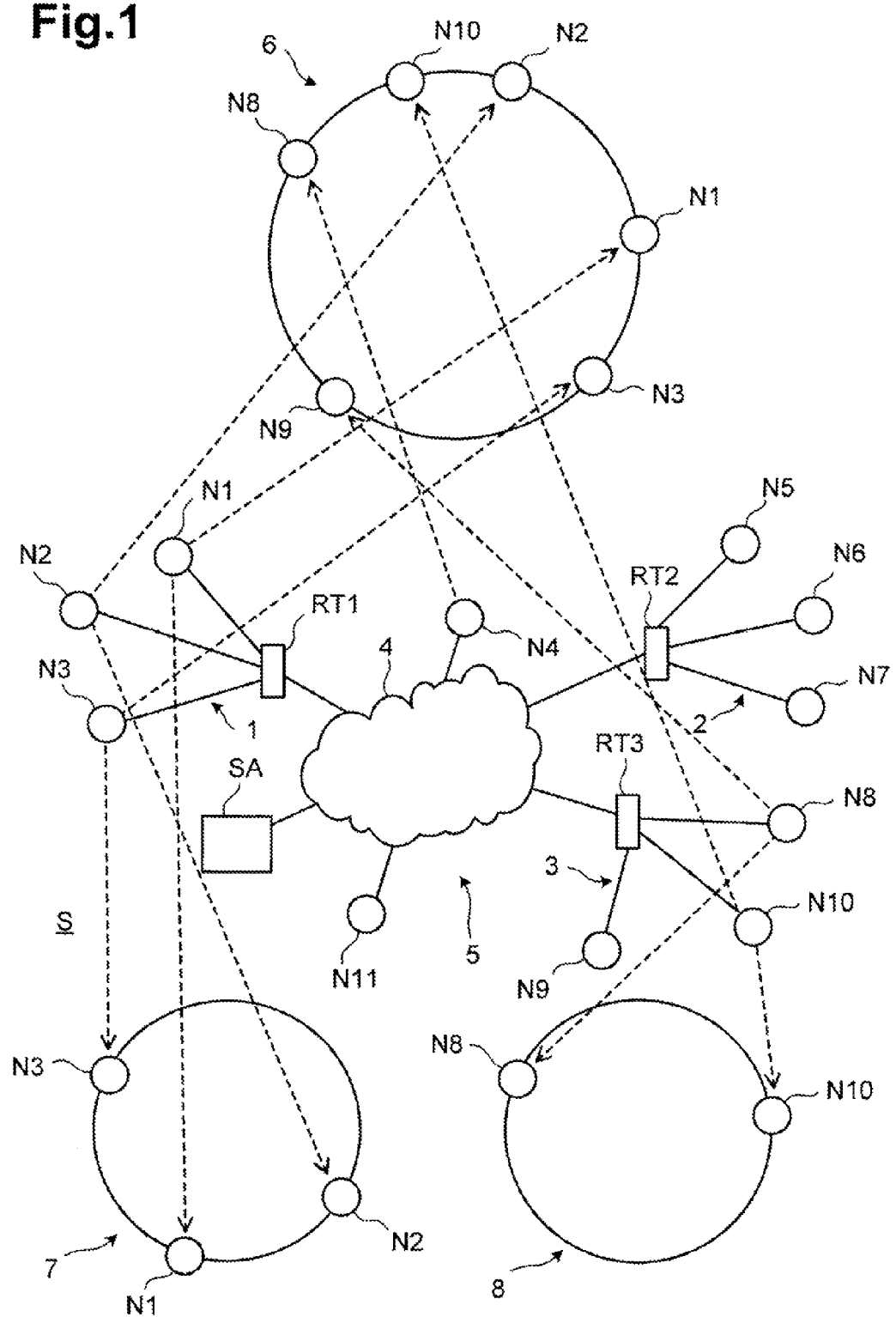
FIG. 1 is a diagram showing one example of an aspect of connection of node devices in a content distributed storage system S.

First, a description will be given of the configuration of a content distributed storage system in the present embodiment with reference to FIG. 1. As shown in FIG. 1, a content distributed storage system S is configured by connecting a plurality of node devices Nn (n=1, 2, 3, ...) to each other through a network 5. The network 5 is a communication network in the real world. For example, the network 5 may be the internet etc. The network 5 is composed of a plurality of physical networks. The physical network may be, for example, an ISP network m (m=1, 2, 3, ...), a wide area network (WAN) 4, etc. Each of the ISP networks is an access network which is built, for example, so that an internet service provider (ISP) can provide internet connection services etc. Each ISP network m is composed of, for example, a telephone line, an optical fiber, etc. Each ISP network m has a router RTm that relays information which is transmitted and received between itself and the network 5. Each of the routers RTm has, for example, a large scale NAT (network address translator) (LSN) function. It is to be noted that the router RTm is an example of the communication equipment of the present invention. Each ISP network m may have one or a plurality of routers arranged to relay information in the ISP network m.

Each node device Nn is connected to the ISP network m, the WAN 4, etc. that makes up the network 5. Hereinafter, the node device is referred to as a "node." Each node is assigned inherent production No. and internet protocol (IP) address. Further, the content distributed storage system S in the present embodiment is a peer-to-peer network system. The peer-to-peer network system is formed by interconnecting some of the plurality of nodes that make up the content distributed storage system S.

It is to be noted that the ISP network m may contain a plurality of access networks. Hereinafter, each of the access networks contained in the ISP network m is referred to as an "LSN network." The LSN network includes a router having the LSN functions that relays information which is transmitted and received between the LSN network and the ISP network m. Further, an LAN may be connected to the WAN 4, the ISP network m, or the LSN network via a router having the NAT functions.

[2. Outline of Group P2P Network]

In the content distributed storage system S, each of the nodes belongs to a plurality of groups based on a range of the network to which the node is connected. Further, the content distributed storage system S generates a plurality of group P2P networks. The group P2P network is a peer-to-peer communication network over which nodes in the group perform the information communication with each other. The group P2P network is a logical overlay network generated on a physical network. The range of the network means a range of the network 5 to which the node is connected. Each of the nodes joins in the group P2P network that corresponds to the group to which the node belongs. Then, the group P2P network is generated when at least any two or more nodes in the same group join in it. It is to be noted that to join in the group P2P network means that the nodes are connected to the group P2P network and so can acquire a content data from this group P2P network. That is, join in the group P2P network means that the nodes register node information corresponding to the group in a routing table. Herewith, the nodes can communicate other node using the routing table. Each group is assigned a group ID, which is inherent identification information. The group ID is also information configured to identify group P2P network. Further, the group ID is information with which each node joins in the group P2P network so that it may perform the information communication with any other member nodes of the group P2P network. It is to be noted that the group ID is one example of the identification information of the present invention. The details of the network range and the group ID will be described later.

Each of the group P2P networks is realized by using a specific algorithm, for example, an algorithm utilizing a distributed hash table (DHT). Further, each of the nodes connected to a content distributed storage system S is assigned a node ID beforehand, which is inherent identification information having a predetermined number of digits. The node ID is a value obtained by hashing an IP address or production number inherently assigned to each node, by using a common hash function.

Further, each node holds its own routing table that uses the distributed hash table (DHT). The routing table rules a destination to which each type of message is to be transferred over the group P2P network. Specifically, the routing table contains a plurality of pieces of node information registered in it including node IDs, IP addresses, and port Nos. of the nodes that are appropriately distant from each other within an ID space. The IP address is an example of the address information of the present invention. The routing table is created for each group which the relevant nodes belong to. Accordingly, each node has a list of the group information formed for it. The group information list has a list form structure in which a plurality of pieces of group information are registered. Each of the group information contains a routing table and a group ID. In such a manner, the routing table for each group is held in a state where it is correlated with the group ID. Each of the nodes connected to the group P2P network stores its minimum required node information as the routing table. When various types of messages are transferred among the nodes, the node information not stored in any of the nodes will be acquired. Such DHT routing is also known in US Patent Application Publication No. 2007/0283043 A1, which is incorporated herein by reference and hence the detailed description thereof is omitted.

In the content distributed storage system S, the replica of content data is distributed in a predetermined file format to a plurality of nodes to be stored. The content data distributed and stored has, for example, various contents. Hereinafter, contents data is referred to as "contents." Further, the replica can be utilized among the nodes. The original of each content is stored in a center server SA connected to the WAN 4. Hereinafter, a node where the content replica is held is referred to as a "content-holding node." In the following description, the original content and the replica will not be distinguished from each other in particular and referred to as a content. To each of those contents, information is appended such as a content name and a content ID, which is the inherent identification information for each of the contents.

Locations of the distributed and stored contents are managed or stored as index information by a node etc. that manages or stores the content locations. Hereinafter, the node that manages and stores the content locations is referred to as a "content root node." The index information contains a pair of the node information of a node where the replica is stored and the content ID of a content etc. The index information is required by each group of the nodes. Therefore, in each of the nodes, the index information for each group is stored in a state where it is correlated with the group ID. Such a content root node is defined so that, for example, it may have a node ID closest to the content ID. The node ID closest to the content ID is, for example, such a node ID that agrees with the content ID more in higher digits.

With this, when the user of any one of the nodes would like to acquire his/her desired content, the node desiring to acquire the content generates a message. Hereinafter, a node whose user desires to acquire a content is referred to as a "user node." This message is a search request message. The search request message contains the content ID of a content desired to be acquired, the node information of a user node, the group ID, etc. The search request message is also a message for searching for a content-holding node. This search request message is sent to the other nodes in accordance with a DHT routing table stored in the user node. That is, the user node sends the search request message toward a content root node. The routing table used in this case is that corresponding to the group ID contained in the search request message. When the node having received the search request message transfers the search request message, this node uses a routing table that corresponds to the group ID contained in the search request message. This causes the search request message to finally arrive at the content root node through the DHT routing having the content ID as a key.

When having received the search request message, the content root node acquires from an index information cache the index information that corresponds to the content ID contained in the received search request message. The index information used in this case is that corresponding to the group ID contained in the search request message. Then, the content root node sends back the search response message containing the acquired index information to the user node, which is the transmission source of the search request message. When having acquired the index information, the user node transmits a content request message to the content-holding node based on the IP address, the port No., etc. of the content-holding node contained in the acquired index information. The content request message contains the content ID of the content desired to be acquired. When having received the content request message, the content-holding node acquires from a content cache area the content that corresponds to the content ID contained in the content request message. Then, the content-holding node transmits to the user node a content request response message containing the acquired content. In such a manner, the user node can download or acquire the contents.

Further, when having acquired the content from the content-holding node to be stored, the stored user node then generates a publish message. The publish message notifies the content root node that the content has been stored. The publish message contains the content ID of the content, the node information of the node that has stored the content, the group ID of the group to which the node Nn belongs, etc. The publish message is sent toward the content root node. This causes the publish message to arrive at the content root node through the DHT routing that uses the content ID as a key in the same manner as the search request message. Then, the content root node receives the publish message. The content root node stores a pair of the node information and the content ID contained in the publish message as the index information in the index information cache area. In this case, the index information cache area for storage corresponds to the group ID contained in the publish message. In such a manner, this user node newly becomes a content-holding node that holds the contents. It is to be noted that when the node belongs to at least two groups, the node transmits publish messages which respectively correspond to those groups.

[3. Network Range and Group ID]

Next, a description will be given of a network range to which a node is connected and a group ID. As described above, the range of a network means a range to which the node is connected over the network 5. Each of the nodes can be connected via the WAN 4 to the network 5. Accordingly, the network 5 provides the widest network range to which the node can be connected in the content distributed storage system S. The group P2P network corresponding to this network 5 is a global P2P network 6 shown in FIG. 1. The global P2P network 6 is a group P2P network in which all the nodes Nn can join.

Then, the network is hierarchically subdivided into network ranges in a descending order starting from the highest order range of the network 5. For example, in a second hierarchy, the network 5 is subdivided into a plurality of network ranges. Also, in a third hierarchy, each of the ranges in the second hierarchy is subdivided into a plurality of network ranges. Further, a plurality of the nodes are hierarchically subdivided into groups corresponding to the network ranges, and the group P2P network is also formed hierarchically. It is to be noted that for ease of explanation, the WAN 4 is assumed to be in the highest order hierarchy.

A description will be given of one example of how to define the network ranges in the second hierarchy or below. For example, a network which is possible to communicate even without going through the router that has the NAT functions, is determined as a network range in the second hierarchy or below. In other words, a group is constituted of the nodes that are capable of communication even without going through the NAT-function router. Inside the ISP network m, there are nodes that are capable of communication without going through the router RTm. It is possible to prevent the amount of information from increasing that passes through a communication line connecting the ISP network m and the WAN 4 to each other because the node does not have to pass the router RTm. Further, it is possible to prevent the amount of information that is relayed by the router RTm from increasing because the node does not have to pass the router RTm. Further, even though the NAT-function router uses in peer-to-peer communication system, peer-to-peer communication system can be performed in the ISP network m. Therefore, each of the ISP networks m is defined as a network range positioned in the second hierarchy.

Further, the plurality of nodes connected to the ISP network m constitutes at least one group. Then, the plurality of nodes in the group forms the group P2P network that corresponds to the ISP network m. For example, as shown in FIG. 1, a group P2P network 7 is formed by a plurality of nodes that join in this group P2P network 7 among any of the nodes connected to the ISP network 1. Further, the group P2P network 8 is formed by the plurality of nodes that join in this group P2P network 8 among those nodes connected to the ISP network 3. The nodes connected to the same ISP network m communicate with each other through the group P2P network that corresponds to this ISP network m. In such a manner, it is possible to decrease the amount of information that is transmitted and received between the different ISP networks m. It is therefore possible to decrease burdens on the line and the router RTm owing to communication between the different ISP networks m.

There are some cases where the ISP network m contains one or a plurality of LSN networks. In such a case, inside the LSN network, the nodes connected to the LSN network can communicate even without going through the LSN network router. Accordingly, each of the LSN networks may be defined as a network range positioned in the third hierarchy. In this case, the nodes connected to any one of the LSN networks are assumed to join in the following three group P2P networks. The three group P2P networks are, for example, the group P2P network that corresponds to the LSN network, the group P2P network that corresponds to the ISP network m positioned in the higher order of the LSN network, and the global P2P network 6. Further, a LAN is constructed in lower order of the WAN4, the ISP network m, or the LSN network. In this case, a network range of the LAN may be determined based on the network covered by LAN.

A group ID necessary for joining in the global P2P network needs to correspond to a network range to which the nodes are connected. Accordingly, in order to generate the group ID, it is necessary to acquire information that denotes the network range. The information denoting the network range is referred to as "network range information." It is to be noted that the network range information is an example of the range information of the present invention. The network range information may include information that identifies, for example, the ISP network, the LSN network, or the LAN. Generally, a router having the NAT functions is connected to each of the networks. The router relays information transmitted and received among networks. Further, each of the routers is assigned an IP address which is used in communication over external network. The IP address is used as the network range information.

One method for acquiring the router's IP address is that a certain node would transmit information via the router which is connected to the network of the certain node. That is, the certain node would transmit the information via the router RTm to the outside of the network which the certain node is connected to. In such a manner, a transmission source IP address of a packet header of the transmitted information is rewritten as the IP address of the router RTm. That is, the local IP address of the node is rewritten into a global IP address. For example, information transmitted to the WAN 4 from the node connected to the ISP network m is relayed by the router RTm. In this case, a transmission source IP address of a packet header is rewritten by the router RTm from the IP address of the node to the router RTm's IP address on the side of the WAN 4. This causes the thus transmitted information to be received by the other nodes. In such a manner, it is possible to acquire the IP address of the router from the packet header of the received information. Further, for example, each of the nodes may store its own global IP address beforehand.

One example of the methods for defining the range of a network positioned in the second hierarchy or below is a method of defining the network range based on a domain name that denotes a domain to which the node belongs. Each ISP is assigned an unique domain name. There is a plurality of levels of domain names. The top level domain name may sometimes be a country domain name which is assigned on the basis of the country name code. As the country domain name, for example, ".jp" may be used which denotes Japan. The country domain name denotes the country where the ISP installed the ISP network m. The country domain name therefore denotes a country level domain to which the node belongs. Further, the country domain name denotes a country where a network which the node is connected to is installed. The country domain name denotes a network range to which the node is connected. Therefore, a country denoted by the country domain name may be defined as the range of a network positioned in the second hierarchy.

In this case, the network range information provides a country domain name. The domain name can be acquired by converting a global IP address of the node in accordance with the domain name system (DNS). Further, the domain name itself assigned to an ISP corresponds to an ISP network built by the ISP. Therefore, an ISP network denoted by the domain name is defined as a network range positioned in, for example, the third hierarchy. In this case, the network range information is the domain name assigned to the ISP. It is to be noted that the domain name and the country domain name are one of the examples of the domain information of the present invention.

Further, another method for defining the network range may be used in addition to both those two methods above. For example, the range of a network positioned in the second hierarchy is defined as the country obtained on the basis of a country domain name. Further, the range of a network positioned in the third hierarchy is defined as the ISP network m obtained on the basis of an IP address of the router RTm. Further, another method for defining the network range may include acquiring the network range information of each node from the managing server.

[4. Generation of and Joining in Group P2P Network]

Next, a description will be given of an outline of the operations to generate and join in a group P2P network in the content distributed storage system S. It is to be noted that an example described blow is based on the assumption that the ISP network m is applied as a network range in the second hierarchy.

Figure 2A:
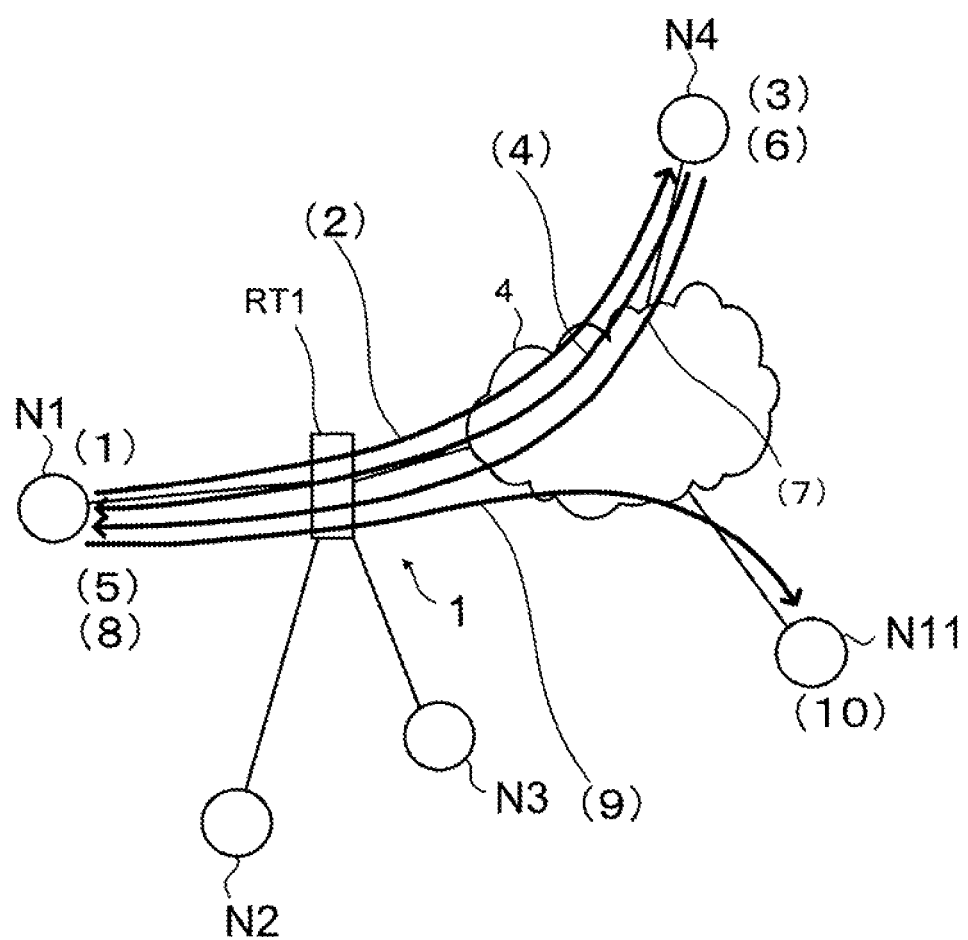
FIG. 2 is a diagram showing one example of operations in a case where a node joins in a group P2P network in the content distributed storage system S.
Figure 2B:
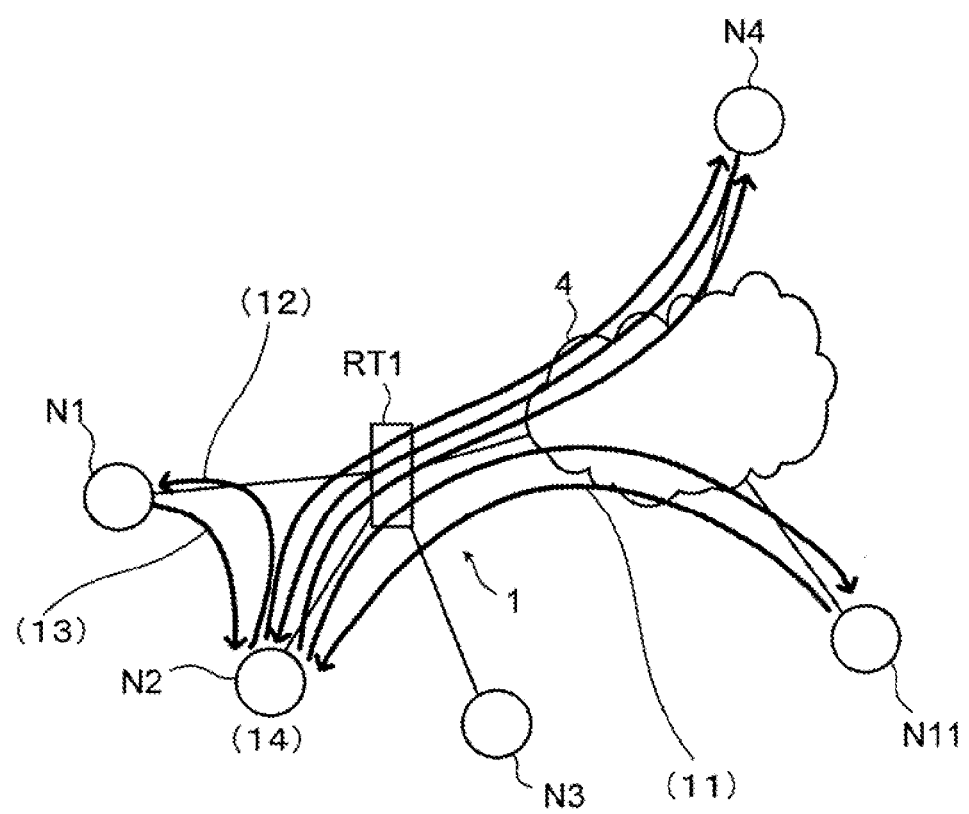

For example, as shown in FIG. 2, it is assumed that a node N1 connected to the ISP network 1 is going to join in a group P2P network. It is to be noted that in this point in time, the group P2P network corresponding to the ISP network 1 is yet to be generated.

Joining in a group P2P network is performed by transmitting a joining-in request message to the node that has already joined in from the node going to join in. In this case, the node going to join in the group P2P network is referred to as a "joining-in request node." Further, the node which is a sending destination of the joining-in request message is referred to as a "contact node." It is to be noted that the contact node is an example of the first information processing device of the present invention. First, as the joining-in request node, the node N1 creates a list of group information. Then, the node N1 adds the following two pieces of information to the group information list as the group information that corresponds to the highest order group (FIG. 2(1)). An empty routing table in which no node information is registered is added to the group information list. Group information containing a group ID of the highest order group is also added to the group information list. The highest order group corresponds to the network 5 as a network range. All the nodes belong to the highest order group. Further, the group ID of the highest order group is set beforehand.

Next, the node N1 transmits the joining-in request message to the contact node in the highest order group, for example, the node N4 (FIG. 2(2)). The contact node in the highest order group may, for example, always be connected to the network 5. The node N1 contains the node information of the node N1 and the group ID of the highest order group into the joining-in request message. It is to be noted that the joining-in request message is an example of the joining-in message of the present invention.

The node N4 registers the node information contained in the joining-in request message into a routing table that corresponds to the group ID contained in the received joining-in request message (FIG. 2(3)). Further, the node N4 acquires a predetermined number of the node information of the nodes other than the node N1 from the routing table that corresponds to the group ID. Then, the node N4 generates a node information notification message containing the acquired node information and the group ID of the highest order group. Then, the node N4 transmits the generated node information notification message to the node N1 (FIG. 2(4)).

The node N1 registers the node information contained in the joining-in request message into the routing table (FIG. 2(5)). In this case, the routing table in which the node information is registered corresponds to the group ID of the highest order group contained in the received joining-in request message. Accordingly, the node N1 completes to join in the global P2P network 6. The node N1 can transmit a message to the nodes whose node information is registered in the routing table.

On the other hand, the global IP address of the node N1 is set beforehand in the transmission source IP address in the packet header of the joining-in request message received by the node N4. That is, the IP address of a router RT1 is set beforehand. Accordingly, the node N4 acquires the global IP address of the node N1. Then, the node N4 generates a group ID of the group that corresponds to the ISP network 1 based on the acquired global IP address (FIG. 2(6)). Subsequently, the node N4 transmits to the node N1 a group information notification message which contains the generated group ID (FIG. 2(7)).

The node N1 adds the group information to the group information list as the information corresponding to the second hierarchy (FIG. 2(8)). The group information added in FIG. 2(8) contains the group ID contained in the received group information notification message and the empty routing table. Subsequently, the node N1 transmits a contact node request message to the group root node (FIG. 2(9)). The contact node request message transmitted in FIG. 2(9) contains the group ID contained in the received group information notification message and the node information of the node N1. The contact node request message is to request the node information of the contact node in a group denoted by the group ID. The group root node manages the information of the nodes that belong to the group denoted by the group ID. Specifically, the group root node holds a group node information management table. The group node information registers the group ID and the node information corresponding to each other. The group root node is defined to be a node that has a node ID closest to the group ID in the same manner as the content root node. The node ID closest to the group ID is, for example, corresponds with the group ID more in higher digits. The contact node request message transmitted from the node N1 arrives at a group root node, for example, a node N11 through DHT routing.

The node N11 registers the group ID a contained in the received contact node request message and the node information corresponding to each other in the group node information management table (FIG. 2(10)). It is to be noted that in this time, the node information other than that of the node N1 is yet to be registered in the group node information management table. Therefore, the node N11 does not notify the node N1 of the node information of the contact node. It is to be noted that the contact root node is an example of the second information processing device of the present invention.

It is assumed that a node N2 to be connected to the ISP network will then be connected to the group P2P network. In this case also, processing similar to that from FIG. 2(1) to FIG. 2(10) is performed on the node N2. At this time, the node information of the node N1 is registered already in the group node information management table of the node N11. Therefore, the node N11 having received the contact node request message from the node N2 transmits a node information notification message to the node N2 (FIG. 2(11)). The node information notification message contains the node information and the group ID of the node N1 registered in the group node information management table.

The node N2 transmits a joining-in request message to the node N1 based on the node information contained in the received node information notification message. In this case, the node N2 transmits the joining-in request message (FIG. 2(12)). The joining-in request message in FIG. 2(12) contains the node information of the node N2 and the group ID contained in the received node information notification message. Then, processing similar to that from FIG. 2(3) to FIG. 2(5) is performed on the nodes N1 and N2. Further, in each of the routing tables of at least the two nodes connected to the ISP network 1, at least one piece of the node information is registered. In this case, the node information registered in the routing tables is that of the other nodes connected to the ISP network 1. Accordingly, a group P2P network corresponding to the ISP network 1 is generated.

The node that has joined in a plurality of the group P2P networks can switch the group P2P network from which contents are acquired, based on predetermined conditions. For example, when the node needs to acquire contents from the ISP network to which the node is connected, this node switches its contents acquisition destination to the group P2P network that corresponds to this ISP network to which the node is connected. Further, for example, when the node needs to acquire contents from the outside of the ISP network to which the node is connected, this node switches its contents acquisition destination to the group P2P network 6. Further, the node may switch the group P2P network from which contents are acquires, based on the user operations.

Further, the routing table and the index information are stored corresponding to each group. Therefore, when the node transmits a search request message or a publish message, the node acquires the node information of its sending destination from the routing table that corresponds to the group ID of the group P2P network which the node communicates with.

Then, when transmitting this search request message or publish message, the node contains the group ID of the group p2p network the node communicates in this search request message. When having received the search request message or the publish message, the node transfers the received message by using the routing table that corresponds to the group ID contained in the received message. Further, when having received the search request message, the content root node transmits to the user node the index information that corresponds to the group ID contained in the search request message. Further, when having received the publish message, the content root node registers the index information of the content-holding node corresponding to the group ID contained in the publish message.

[5. Configurations and Functions of the Devices]

Next, a description will be given of the configurations and the functions of the devices with reference to FIGS. 3 and 4.

[5.1 Configuration of Center Server SA]

Figure 3:
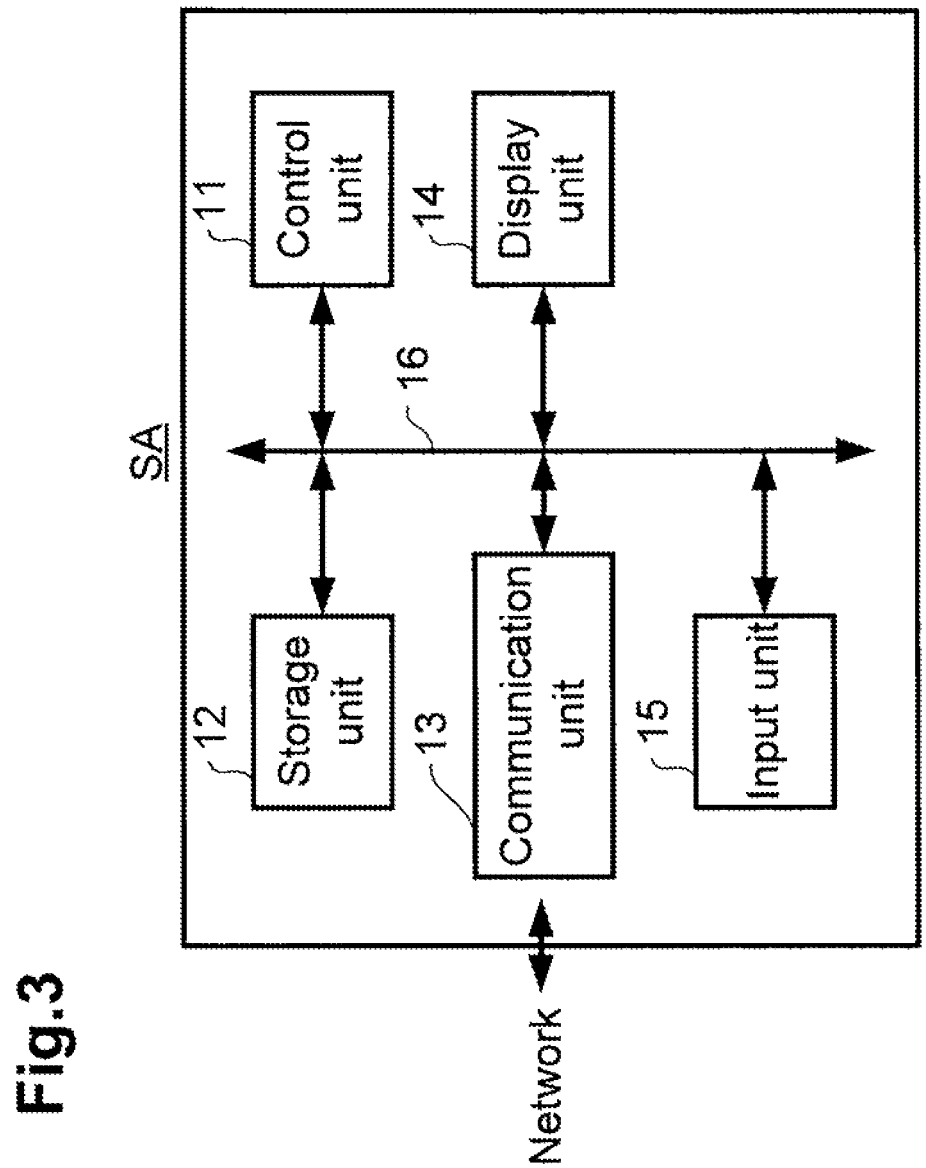
FIG. 3 is a diagram showing a configuration example of a center server SA.

As shown in FIG. 3, the center server SA includes a control unit 11. The control unit 11 is constituted of a CPU having operational functions, a working RAM, an ROM storing various kinds of data and programs, etc. Further, the center server SA includes a storage unit 12. The storage unit 12 is constituted of a Hard Disk etc. for storing and saving the various kinds of data and programs. Furthermore, the center server SA includes a communication unit 13. The communication unit 13 controls the communication of information among the nodes via a network 8 etc. Additionally, the center server SA includes a display unit 14. The display unit 14 may be a CRT or an LCD for displaying various kinds of information. Further additionally, the center server SA includes an input unit 15. The input unit 15 receives an instruction from the user and provides the control unit 11 with an instruction signal that corresponds to this instruction. The input unit 15 may be, for example, a keyboard or a mouse. Those control unit 11, storage unit 12, communication unit 13, display unit 14, and input unit 15 are connected to each other via a bus 16.

The control unit 12 stores the IDs, IP addresses, port Nos. etc. of the nodes. The control unit 11 operates integrated control on the whole center server SA when the CPU reads the programs stored in the storage unit 12 etc. to execute them.

[5.2 Configurations of the Nodes]

Figure 4:
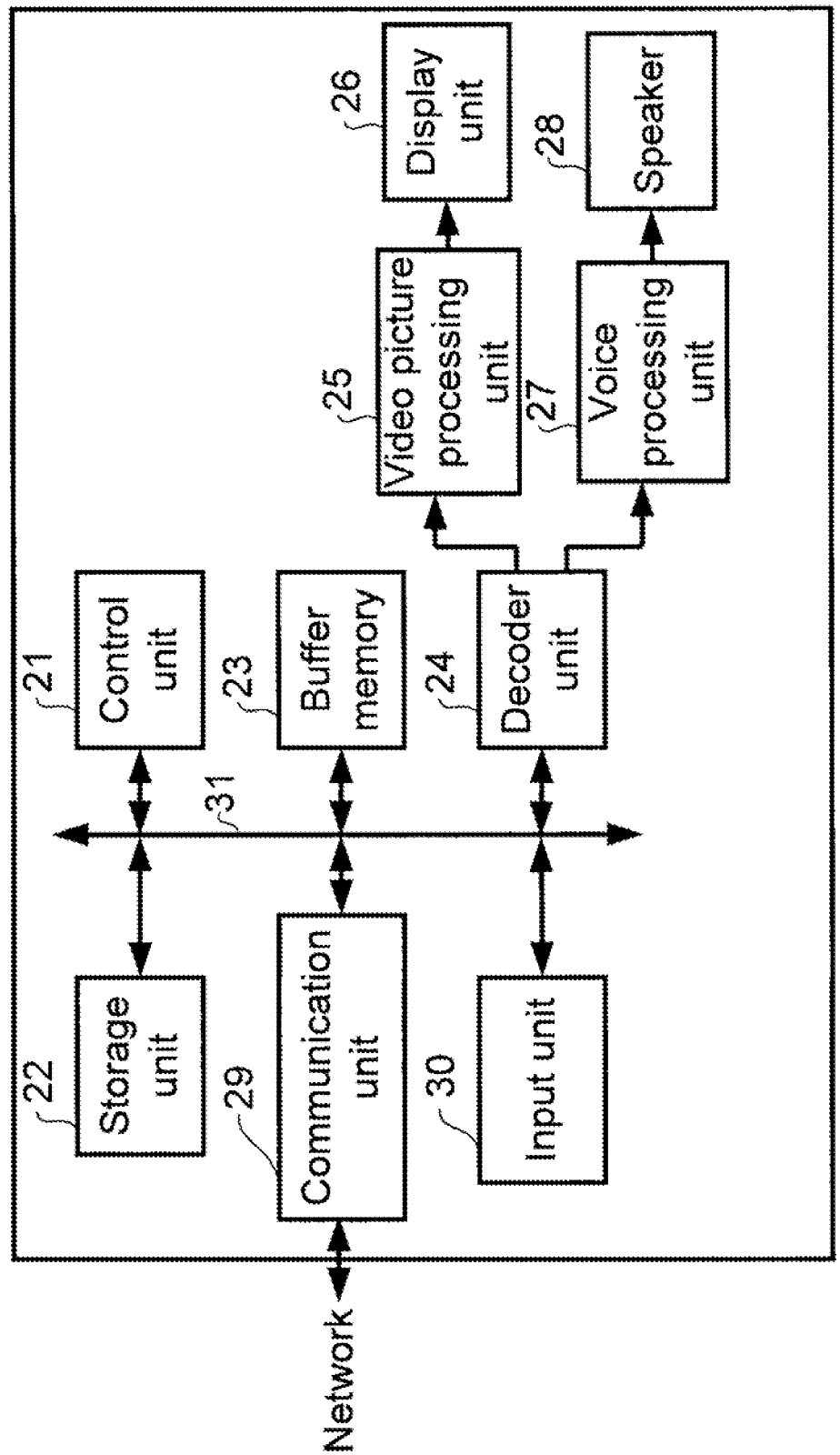
FIG. 4 is a diagram showing a configuration example of the node.

As shown in FIG. 4, each of the nodes includes a control unit 21 as its computer. The control unit 21 is constituted of a CPU having operational functions, a working RAM, an ROM storing various kinds of data and programs, etc. Further, each node includes a storage unit 22 and a buffer memory 23. The storage unit 22 is constituted of a hard disk (HD) etc. for storing and saving various kinds of data and programs. The buffer memory 23 temporarily accumulates a replica etc. of received contents. Furthermore, each node includes a decoder unit 24. The decoder unit 24 decodes encoded video data or video picture information contained in the contents replica and audio data or voice information etc. Additionally, each node includes a video picture processing unit 25 and a display unit 26. The video picture processing unit 25 performs predetermined drawing processing on this decoded video data etc. to output as a video signal. The display unit 26 may be a CRT or an LCD for displaying based on the video signal output from the video picture processing unit 25. Further additionally, each node includes a voice processing unit 27 and a speaker 28. The voice processing unit 27 converts this decoded digital audio data into an analog audio signal (D/A conversion) and then amplifies it with an amplifier to output. The speaker 28 outputs the audio signal output from the voice processing unit, as a sound wave. Further additionally, each node includes a communication unit 29. The communication unit 29 controls the communication of information among the other nodes via the network 8. Further additionally, each node includes an input unit 30. The input unit 30 receives an instruction from the user and provides the control unit 21 with an instruction signal that corresponds to this instruction. The input unit 30 may be, for example, a keyboard, a mouse, a remote controller, or an operation panel. Those control unit 21, storage unit 22, buffer memory 23, decoder unit 24, communication unit 24, and input unit 30 are connected to each other via a bus 31.

The storage unit 22 constitutes one example of the first and second storage unit. The storage unit 22 stores beforehand the node information of the nodes themselves, the IP address of the center server, and the port Nos. Further, the storage unit 22 stores beforehand the group ID of the highest order group as well as the IP address and port No. of the contact node in the highest order group. Further, the storage unit 22 stores a list of the group information. Further, the storage unit 22 stores the index information and the group ID corresponding to each other. Further, the storage unit 22 stores the setting of a specified number which is used when deciding whether to transmit a joining-in request message or not. If the number of pieces of the node information registered in a routing table is equal to or less than the specified number, the joining-in request message is transmitted in order to join in the group P2P network that corresponds to this routing table. Further, the storage unit 22 stores the number of group hierarchies and a network range information specification table. The number of group hierarchies is information that denotes how many hierarchies of the group P2P networks are to be generated starting from the highest order hierarchy. For example, when 3 (three) is set as the number of group hierarchies, three hierarchies of group P2P networks starting from the highest order hierarchy are generated. The network range information specification table denotes which information is to be used as the network range information.

Specifically, in the network range information specification table, an information class is set beforehand for each hierarchy. The information class denotes the class of information to be used as the network range information. For example, the range of a network positioned in the second hierarchy may be determined to be a country and that positioned in the third hierarchy may be determined to be the ISP network m. In this case, corresponding to the second hierarchy, the information class denoting the country's domain name is set. Further, corresponding to the third hierarchy, the information class denoting the node's global IP address is set. It is to be noted that the number of group hierarchies having the same contents and the network range information specification table are set for all of the nodes. Further, the storage unit 22 stores beforehand a hash function which is used by the node to generate a group ID as a contact node.

Further, the storage unit 22 stores beforehand the downloaded contents and content IDs corresponding to each other. Furthermore, the storage unit 22 stores beforehand a variety of programs such as the operating system and P2P software.

It is to be noted that the P2P software is an example of the information processing programs of the present invention. The P2P software performs processing for joining in each group P2P network. Further, the P2P software permits the node to perform the information communication with any other nodes Nn in each of the group P2P networks. It is to be noted that the P2P software may be downloaded from, for example, the center server SA. Further, the P2P software may be recorded in a recording medium and then read via a drive from this recording medium.

The control unit 21 permits the CPU to read the programs stored in the storage unit 22 etc. to perform various kinds of processing.

[6. Operations of Content Distributed Storage System]

Next, a description will be given of operations of the content distributed storage system S in the present embodiment with reference to FIGS. 5 to 8.

Figure 5:
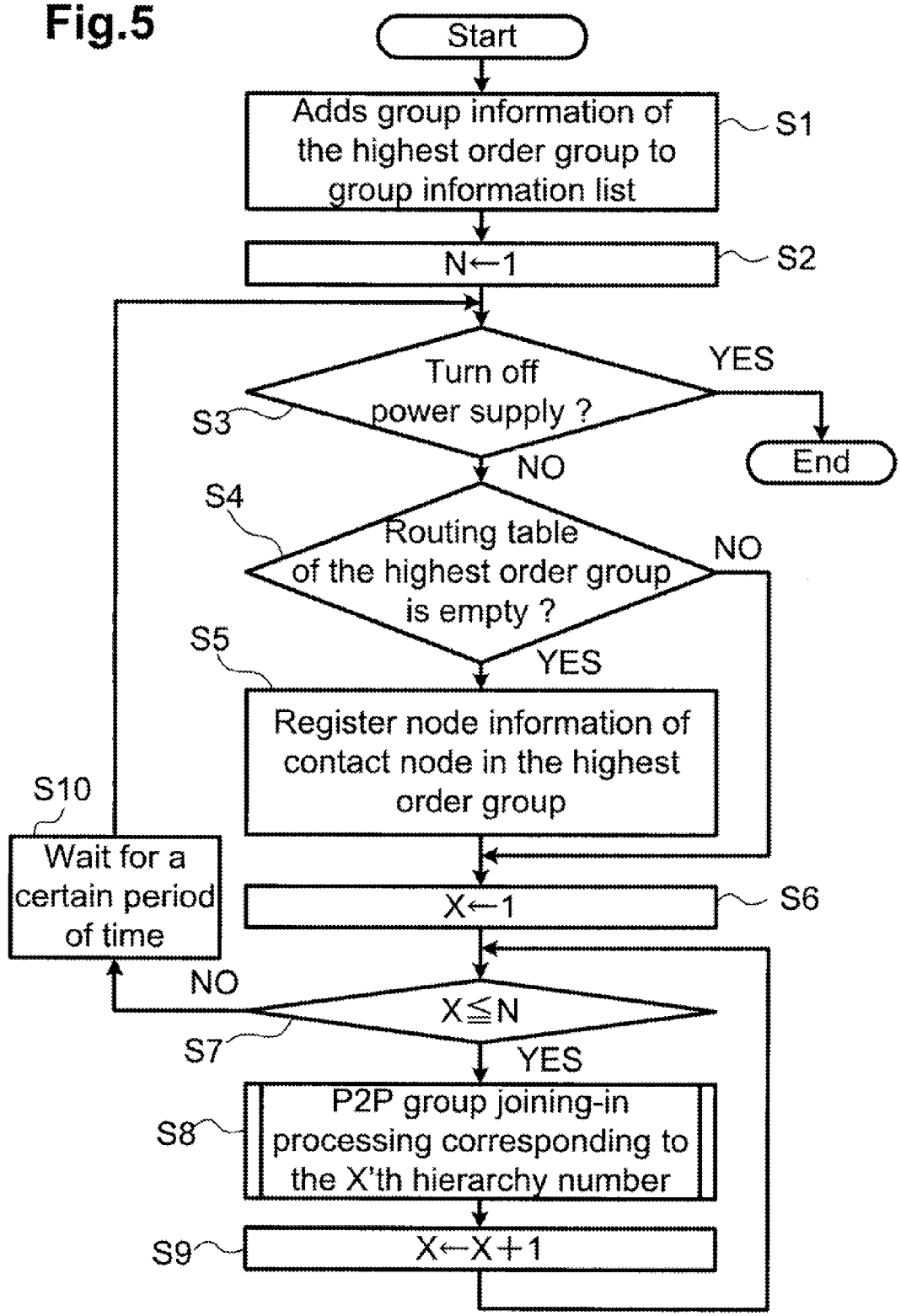
FIG. 5 is a flowchart showing a processing example in processing to monitor a node routing table.

As show in FIG. 5, routing table monitor processing is performed to periodically transmit each joining-in request message. The control unit 21 performs the flow chart of the FIG. 5 periodolically. In this case, the joining-in request message is used by the node to join in the group P2P networks of a plurality of groups to which it belongs. By transmitting the joining-in request message periodically, the number of pieces of node information registered in the routing table is kept to be larger than a specified number.

The routing table monitor processing is started when, for example, a power supply for the node is turned on. First, the control unit 21 newly creates a list of group information and stores the created list in the storage unit 22. Then, the control unit 21 adds the group information of the highest order group to the group information list (step S1). Specifically, the control unit 21 adds the group information containing an empty routing table and a group ID of the highest order group. Subsequently, the control unit 21 sets to 1 the number of pieces of group information N registered in the group information list (step S2).

Next, the control unit 21 determines whether or not a request is given by the user to turn off the power supply (step S3). In this case, when no request is given by the user to turn off the power supply (NO in step S3), the control unit 21 determines whether or not a routing table of the group information of the highest order group is empty (step S4). In this case, when the routing table of the group information of the highest order group is empty (YES in step S4), the control unit 21 registers the node information (step S5). Specifically, the control unit 21 registers the node information of the contact node in the highest order group into the routing table of the group information of the highest order group. When it is determined in step S4 that the routing table of the group information of the highest order group is not empty (NO in step S4) or the processing in step S5 is completed, the control unit 21 sets 1 to an index X (step S6).

Next, the control unit 21 determines whether or not the value of the index X is equal to or less than the number of pieces of group information N (step S7). In this case, when the value of the index X is equal to or less than the number of pieces of group information N (YES in step S7), the control unit 21 performs P2P group joining-in processing to be described later (step S8). In this case, the control unit 21 specifies the group information corresponding to the X'th hierarchy number out of the group information list. In the P2P group joining-in processing, processing is performed to join in the group P2P network of a group in the X'th hierarchy. Subsequently, the control unit 21 adds 1 to X (step S9) and makes a shift to step S7.

In step S7, when the value of the index X is larger than the number of pieces of group information N (NO in step S7), the control unit 21 waits for a certain period of time (step S10). Then, the control unit 21 makes a shift to step S3. In step S3, when a request is given by the user to turn off the power supply (YES in step S3), the control unit 21 completes the routing table monitor processing.

Through the later-described P2P group joining-in information and group information notification message reception processing, the pieces of the group information that correspond to the second hierarchy or below are sequentially added to the group information list. This increments the number of pieces of group information N. Accordingly, after performing the P2P group joining-in processings that respectively correspond to the pieces of the group information registered in the group information list, the control unit 21 waits for a certain period of time.

Figure 6:
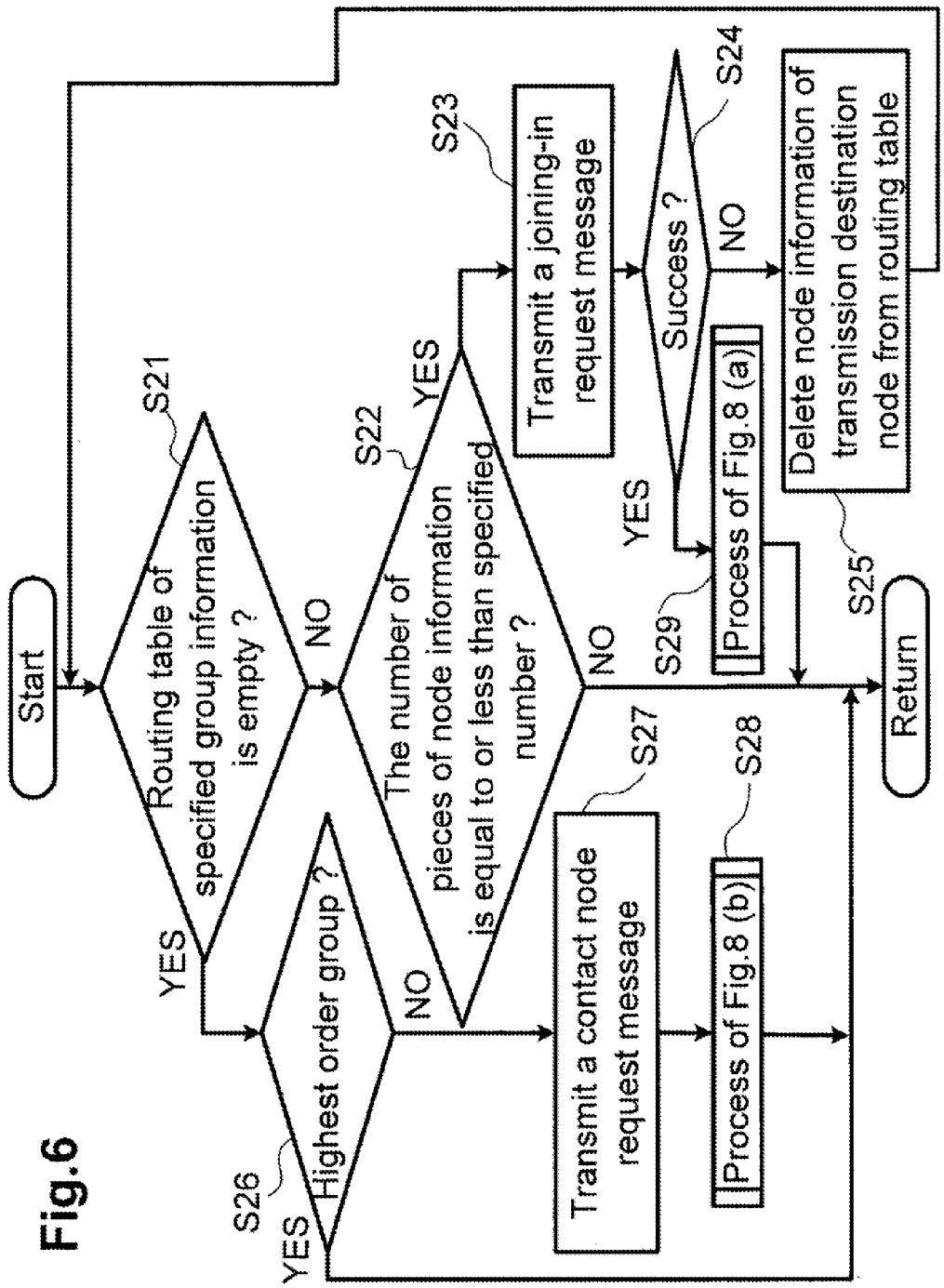
FIG. 6 is a flowchart showing a processing example in processing for the node to join in a P2P group.

Next, a description will be given of processing for the node to join in a P2P group according to the present embodiment, with reference to FIG. 6.

First, the control unit 21 determines whether or not a routing table of specified group information is empty (step S21). In this case, when the routing table of the specified group information is not empty (NO in step S21), the control unit 21 determines whether or not the number of pieces of the node information is equal to or less than a specified number (step S22). The number of pieces of node information that is used here is registered in the routing table of the specified group information. In this case, when the number of pieces of the node information registered in the routing table of the specified group information is larger than the specified number (NO in step S22), the control unit 21 completes the P2P group joining-in processing.

On the other hand, when the number of pieces of the node information registered in the routing table of the specified group information is equal to or less than the specified number (YES in step S22), the control unit 21 transmits a joining-in request message (step S23). Specifically, the control unit 21 transmits the joining-in request message to an arbitrary one of the nodes whose node information is registered in the routing table of the specified group information. In this case, the control unit 21 contains the following three pieces of information into the joining-in request message. Those three pieces of information are the node information of the node, the group ID of the specified group information, and the hierarchy number that denotes the hierarchy of a group which corresponds to the specified group information. For example, when the specified group information is that of the highest order group, 1 is set as the hierarchy number. Further, for example, when the specified group information is that of the second hierarchy group, 2 is set as the hierarchy number. Subsequently, the control unit 21 determines whether or not the joining-in request message is transmitted successfully (step S24). For example, when the transmission destination node of the joining-in request message is out of the group P2P network, the transmission of the joining-in request message fails. In this case, when the transmission of the joining-in request message is successful (YES in step S24), the control unit 21 perform s step S29. On the other hand, when the transmission of the joining-in request message fails (NO in step S24), the control unit 21 deletes the node information of the transmission destination node of the joining-in request message from the routing table of the specified group information (step S25). The control unit 21 makes a shift to step S21 after completing the processing in step S25.

When it is determined in step S21 that the routing table of the specified group information is empty (YES in step S21), the control unit 21 determines whether or not the specified group information is that of the highest order group (step S26). For example, the control unit 21 determines whether or not the group ID of the specified group information agrees with that of the highest order group. In this case, when the specified group information is that of the highest order group (YES in step S26), the control unit 21 completes the P2P group joining-in processing.

On the other hand, when the specified group information is not that of the highest order group (NO in step S26), the control unit 21 transmits a contact node request message (step S27). Specifically, the control unit 21 acquires the group information registered at a position one order higher than the specified group information. Then, the control unit 21 transmits the contact node request message to an arbitrary one of the nodes whose node information is registered in the routing table of the acquired group information. That is, the control unit 21 transmits the contact node request message to the node that joins in the group P2P network of the group one order higher than the group on which the P2P group joining-in processing is performed. Hereinafter, a group which is one order higher than the group on which the P2P group joining-in processing is performed is referred to as a "higher order group." Further, in this case, by the control unit 21 the node information of the node itself, a first group ID, and a second group ID are contained in the contact node request message. The first group ID is the group ID of the specified group information. The transmitted contact node request message arrives at the node having the node ID closest to the first group ID through the DHT routing. That is, the contact node request message arrives at a group contact node. The second group ID is the group ID of a higher order group. The node having received the contact node request message transfers this message. The transfer destination of the contact node request message is determined by using a routing table of the group information that corresponds to the second group ID contained in the contact node request message.

The control unit 21 performs a process of FIG. 8(*a*) in step S28. The detail of the process of FIG. 8(*a*) is described below. In the process of the FIG. 8(*a*), the control unit 21 register the group information in the storage unit 22.

In the step S29, the control unit 21 performs a process of FIG. 8(*b*). The detail of the process of FIG. 8(*b*) is described below. In the process of the FIG. 8(*b*), the control unit 21 register the node information in the routing table. That is, the control unit 21 can communicate other node device using registered routing table. Herewith, the node can join-in the group P2P network. The control unit 21 completes the P2P group joining-in processing after completing the processing in step S27.

Figure 7A:
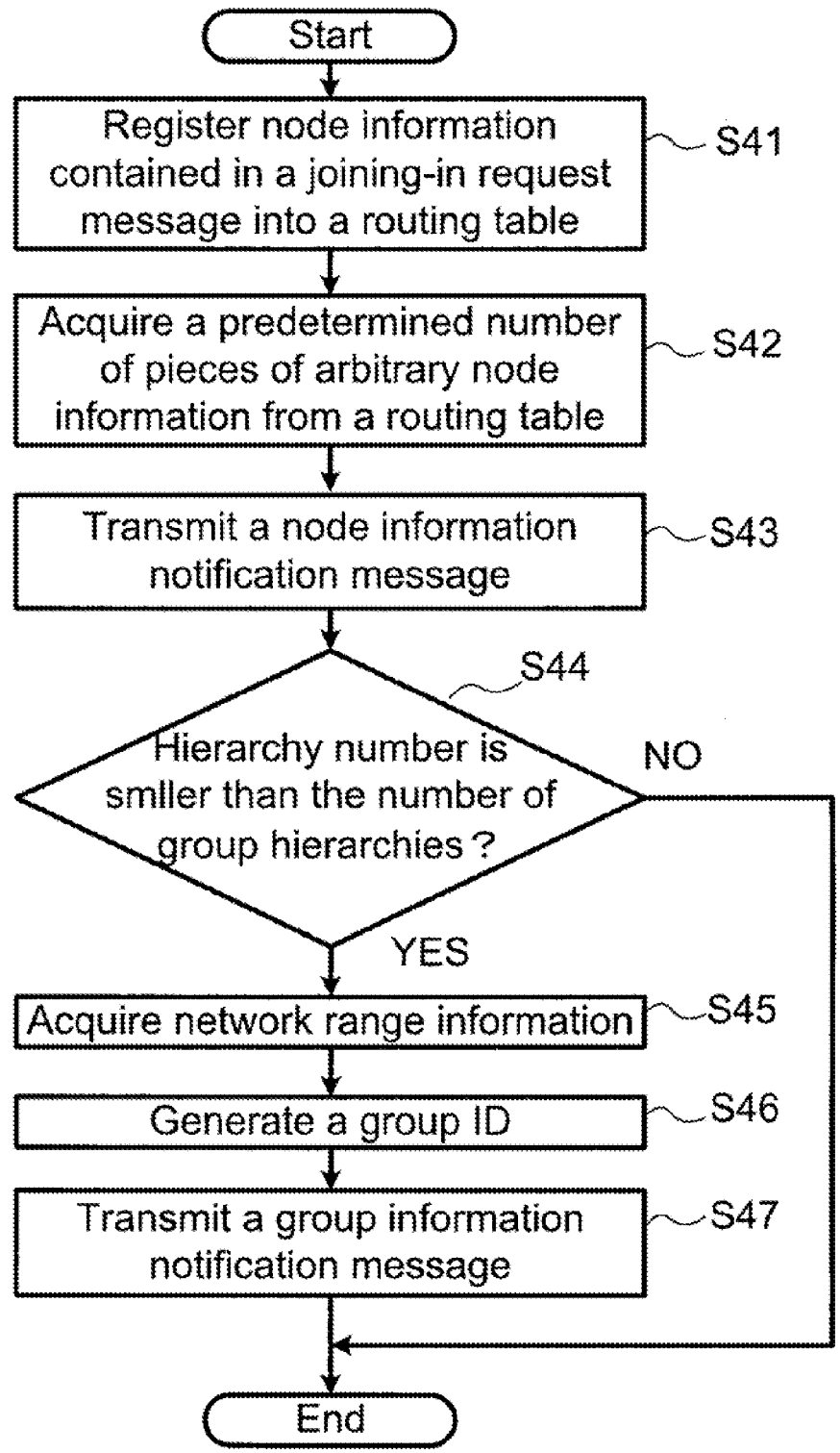
FIG. 7A is a flowchart showing a processing example in processing to receive a joining request message from the node.

The following will describe joining-in request message reception processing in the present embodiment with reference to FIG. 7A.

The joining-in request message reception processing starts, when the control unit 21 in the contact node receives a joining-in request message. First, the control unit 21 registers the node information contained in the joining-in request message into a routing table (step S41). The routing table into which the node information is registered in step S41 is that of the group information that corresponds to the group ID contained in the received joining-in request message. Subsequently, the control unit 21 acquires a predetermined number of pieces of arbitrary node information from the routing table of the group information corresponding to the group ID contained in the received joining-in request message (step S42). It is to be noted that the node information registered in step S41 is excluded from the acquisition target in step S42. Further, when the number of pieces of the node information registered in the routing table is less than the predetermined number, the pieces of the registered node information are all acquired. Subsequently, the control unit 21 transmits a node information notification message containing the acquired node information to the node of the transmission source of the joining-in request message (step S43). In this case, the control unit 21 sets the group ID contained in the received joining-in request message into the node information notification message.

Next, the control unit 21 determines whether or not the hierarchy number contained in the received joining-in request message is smaller than the value of the number of the group hierarchies (step S44). In this case, when the hierarchy number contained in the received joining-in request message is smaller than the value of the number of the group hierarchies (YES in step S44), the control unit 21 generates a group ID. The hierarchy number contained in the joining-in request message denotes a hierarchy of the group denoted by the group ID contained in the joining-in request message. That is, the hierarchy number denotes a hierarchy of the group that corresponds to the group P2P network which the joining-in request node is about to join in. When the hierarchy number is smaller than the value of the number of the group hierarchies, it means that the joining-in request node should join in the group P2P network of the group in a further lower hierarchy. Accordingly, the control unit 21 generates a group ID of the group in a hierarchy which is one order lower than that of the group that corresponds to the group P2P network which the joining-in request node is about to join in.

First, the control unit 21 acquires network range information (step S45). Specifically, the control unit 21 adds 1 to the hierarchy number contained in the joining-in request message. Then, the control unit 21 acquires an information class that corresponds to the diarchy No. from the network range information specification table. Then, the control unit 21 acquires the network range information in accordance with the acquired information class. For example, when the information class denotes a global IP address of the node, the control unit 21 acquires the global IP address from the IP address of the transmission source in the packet header of the received joining-in request message. Further, for example, when the information class denotes a country domain name, the control unit 21 converts the global IP address of the node into a domain name. Then, the control unit 21 acquires the country domain name from the domain name.

Next, the control unit 21 generates a group ID by hashing the acquired network range information (step S46). Next, the control unit 21 transmits a group information notification message containing the generated group ID to the joining-in request node that has transmitted the joining-in request message (step S47).

When it is determined in step S44 that the hierarchy number contained in the joining-in request message is equal to or smaller than the value of the number of the group hierarchies (NO in step S44) or the processing in step S47 is completed, the control unit 21 completes the joining-in request message reception processing.

The following will describe contact node request message reception processing in the present embodiment with reference to FIG. 7B.

When the control unit 21 in the group root node receives a contact node request message, the contact node request message reception processing starts. First, the control unit 21 registers the group ID and the node information contained in the received contact node request message in the group node information management table in a state where they are correlated with each other (step S61). It is to be noted that the group node information management table has a finite size. Therefore, the number of the respective pieces of node information and group IDs that can be registered in the group node information management table is limited. Accordingly, when the group node information management table has no empty portions for registering the node information and the group ID, the control unit 21 abandons the least recent information. Then, the control unit 21 registers the most recent node information and group ID in the empty portions.

Next, the control unit 21 determines whether or not the node information that corresponds to the group ID contained in the received contact node request message is registered in the group node information management table (step S62). It is to be noted that the node information registered in step S61 is not to be determined on whether or not it is registered in the group node information management table. In this step, when it is determined that the node information corresponding to the group ID contained in the contact node request message is registered in the group node information management table (YES in step S62), the control unit 21 acquires a predetermined number of pieces of the node information that correspond to the group ID contained in the contact node request message from the group node information management table (step S63). It is to be noted that when the number of pieces of the registered node information is less than the predetermined number, the pieces of the registered node information are all acquired. Subsequently, the control unit 21 transmits a node information notification message containing the acquired node information to the node that has transmitted the content node request message (step S64). In this case, the control unit 21 sets the first group ID contained in the received contact node request message into the node information notification message.

When it is determined in step S62 that the node information that corresponds to the group ID contained in the contact node request message is not registered in the group node information management table (NO in step S62) or the processing in step S64 is completed, the control unit 21 completes the contact node request message reception processing.

It is to be noted that also in a case where any node other than the group root node has received the contact node request message, the information may be registered into the group node information management table. Specifically, the node registers the group ID and the node information contained in the received contact node request message into the group node information management table in a state where they are correlated with each other. Then, the node transfers the contact node request message by using the routing table. According to this, even after the group root node gets out of the group P2P network, the joining-in request node can acquire the node information from a new group root node.

The following will describe group information notification message reception processing in the present embodiment with reference to FIG. 8A. When the control unit 21 in the joining-in request node receives a group information notification message, the group information notification message reception processing starts. First, the control unit 21 determines whether or not the group information corresponding to the group ID contained in the received group information notification message is registered in the group information list (step S81). In this step, when it is determined that the group information corresponding to the group ID contained in the received group information notification message is not registered in the group information list (NO in step S81), the control unit 21 adds 1 to the number of pieces of group information N (step S82). Subsequently, the control unit 21 adds the group information to the group information list (step S83). Specifically, the control unit 21 adds the group information to such a position in the group information list that corresponds to a hierarchy denoted by the value of the number of pieces of group information N. In this case, the control unit 21 adds the group information containing an empty routing table and the group ID contained in the group information notification message.

When it is determined in step S81 that the group information corresponding to the group ID contained in the group information notification message is registered (YES in step S81) or the processing in step S83 is completed, the control unit 21 performs the P2P group joining-in processing (step S84). In this case, the control unit 21 specifies the group information that corresponds to the group ID contained in the group information notification message. When the processing in step S84 completes, the control unit 21 completes the group information notification message reception processing.

Figure 8B:
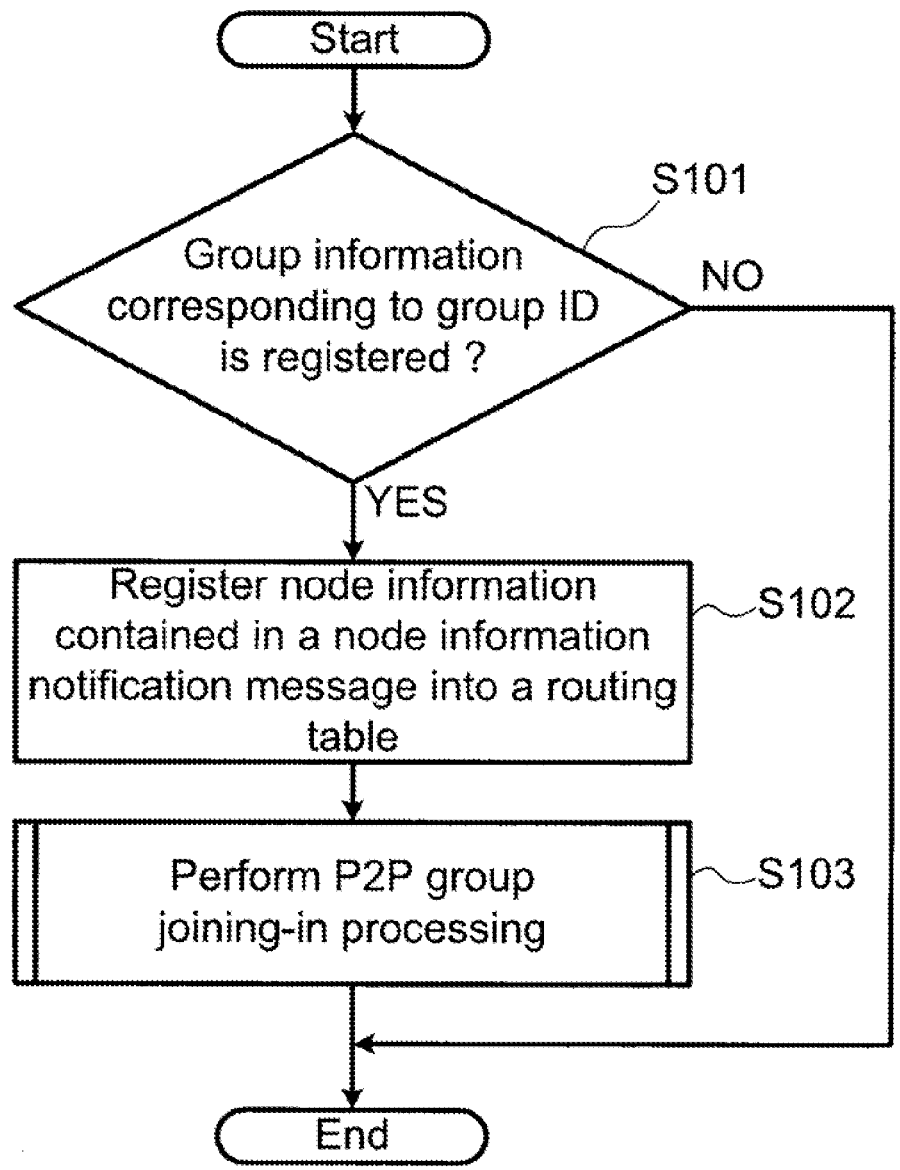
FIG. 8B is a flowchart showing a processing example in processing to receive a node information notification message from the node.

The following will describe node information notification message reception processing in the present embodiment with reference to FIG. 8B. When the control unit 21 in the joining-in request node receives a node information notification message, the node information notification message reception processing starts. First, the control unit 21 determines whether or not the group information corresponding to the group ID contained in the received node information notification message is registered in the group information list (step S101). In this step, when it is determined that the group information corresponding to the group ID contained in the node information notification message is registered (YES in step S101), the control unit 21 registers the node information contained in the node information notification message into a routing table (step S102). The routing table into which the node information is registered in step S102 is that of the group information corresponding to the group ID contained in the node information notification message. Subsequently, the control unit 21 performs the P2P group joining-in processing (step S103). In this case, the control unit 21 specifies the group information that corresponds to the group ID contained in the node information notification message.

When it is determined in step S101 that the group information corresponding to the group ID contained in the node information notification message is not registered (NO in step S101) or the processing in step S103 is completed, the control unit 21 completes the node information notification message reception processing.

As hereinbefore described, in the present embodiment, the contact node generates a group ID based on the acquired network range information. Based on the generated group ID, the joining-in request node joins in a group P2P network. Therefore, the node can communicate with the other nodes connected to the same range on a network via the group P2P network that corresponds to a group to which it belongs.

Further, the joining-in request node transmits to a group root node a contact node request message containing the generated group ID. The group root node transmits a node information notification message to the joining-in request node. The node information registered in the group node information management table in a state where it is correlated with the group ID contained in the contact node request message is contained in the node information notification message. Based on the generated group ID and the node information contained in the node information notification message, the joining-in request node joins in the group P2P network. Therefore, the node can join in the group P2P network by communicating with the other nodes belonging to the same group by using the acquired node information.

The joining-in request node registers the node information into a routing table corresponding to the generated group ID. In this case, the node information registered in the routing table is contained in the node information notification message transmitted by the contact node. Therefore, the node information of the nodes belonging to the same group is communicated among themselves. Then, the pieces of the communicated node information are stored in the respective nodes as information that denotes the transmission destination of the information in the group. In such a manner, the group P2P network can be generated.

The group root node transmits the node information to the joining-in request node. In this case, the node information to be transmitted is determined from among the pieces of the node information registered in the group node information management table. Specifically, the node information is registered in the group node information management table in a state where it is correlated with the group ID contained in the contact node request message, and is other than the node information of the joining-in request node. Therefore, the joining-in request node can acquire the node information of the node currently belonging to the P2P network from the group root node. Accordingly, stable communication can be conducted through the group P2P network.

Further, the node periodically transmits a joining-in request message for each of the group P2P networks. Therefore, stable communication can be conducted through the group P2P network by using a sufficient number of pieces of the node information. Further, the node manages the group node information as the group root node. Therefore, the burden of managing the group node information of a plurality of the groups can be distributed over a plurality of the nodes.

Further, the present invention features that the contact node would acquire the IP address of the router RTm, which is the global IP address of a joining-in request node, as network range information. Therefore, it is possible to prevent the amount of information passing through a communication line interconnecting the networks from increasing due to communication over the group P2P network. Further, it is also possible to prevent the amount of information relayed by the router RTm from increasing due to communication over the P2P network. Further, intra-network communication is possible even if it is difficult to conduct peer-to-peer communication between the networks because the IP address is rewritten by the router RTm.

Further, the contact node acquires as network range information a domain name that denotes a domain to which the joining-in request node belongs. Accordingly, the range of a network constituted of nodes belonging to the same domain is determined to be a network range to which the nodes are connected. Therefore, it is possible to generate a group P2P network by grouping the nodes in domain units. Further, when the node has joined in a plurality of the group P2P networks, the group P2P network for the purpose of acquiring contents is switched on the basis of predetermined conditions. Therefore, the communication can be conducted more efficiently through the group P2P network that matches the conditions.

It is to be noted that in the aforesaid embodiment, the contact node having received a joining-in request message has generated a group ID. However, the joining-in request node may generate the group ID. For example, the contact node having received the joining-in request message acquires the network range information. Subsequently, the contact node transmits the acquired network range information to the joining-in request node. Next, the joining-in request node generates the group ID based on the received network range information.

Further, the network range information may be stored in the node beforehand. For example, the network range information denoting a network range to which the node itself is connected is stored in the storage unit 22 for each hierarchy. After having joined in the global P2P network 6, the node acquires from the storage unit 22 the network range information that corresponds to the second hierarchy. Subsequently, the node generates a group ID based on the acquired network range information. Then, based on the generated group ID, the node joins in the group P2P network in a group of the second hierarchy. The node performs the similar processing on the third hierarchy or below.

Further, in the aforesaid embodiment, the contact node having received a joining-in request message from the joining-in request node has transmitted a node information notification message to this joining-in request node. However, any node other than the contact node may transmit the node information notification message. For example, the contact node selects a predetermined number of pieces of the node information from a routing table that corresponds to a group ID contained in the joining-in request message. Subsequently, the contact node transfers the joining-in request message to the node denoted by each of the selected node information. Then, the node that has received this transferred joining-in request message transmits the node information notification message to the joining-in request node.

Further, in the aforesaid embodiment, the contact node having received the joining-in request message from the joining-in request node has transmitted a group information notification message to the joining-in request mode. However, the group root node may transmit the group information notification message. For example, the contact node transmits the group information notification request message toward the group root node. The group information notification request message contains the node information contained in the joining-in request message and the generated group ID. The transmitted group information notification request message arrives at the group root node through the DHT routing. The group root node correlates the node information and the group ID contained in the received group information notification request message. Then, the group root node registers the correlated node information and group ID into the group node information management table. Further, the group root node acquires from the group node information management table the node information that corresponds to the group ID contained in the group information notification request message. Then, the group root node transmits a group information notification message containing the acquired node information to the joining-in request node. In this case, the group root node contains the group ID contained in the received group information notification request message into the group information notification message. By receiving the group information notification message, the joining-in request node can acquire the group ID and the node information of the contact node. Therefore, the joining-in request node need not transmit the contact node request message.

Further, when the node information corresponding to the generated group ID is registered in the group node information management table, the contact node may contain this node information in the group information notification message. In this case, the joining-in request node need not transmit the contact node request message.

Further, in the aforesaid embodiment, a peer-to-peer network utilizing the DHT has been applied to an overlay network. However, the present invention is not limited to this embodiment. For example, any other peer-to-peer system or a system using an overlay network may be applied. The peer-to-peer system not utilizing the DHT may include, for example, a hybrid peer-to-peer system. In the case of the hybrid peer-to-peer system, a center server SA can be applied as the information processing device of the present invention. For example, the center server SA manages the node information of all the groups.

Although an illustrative embodiment and examples of modifications of the present invention have been described in detail herein, the scope of the invention is not limited thereto. It will be appreciated by those skilled in the art that various modifications may be made without departing from the scope of the invention. Accordingly, the embodiment and examples of modifications disclosed herein are merely illustrative. It is to be understood that the scope of the invention is not to be so limited thereby, but is to be determined by the claims which follow.

What is claimed is:

1. An information communication system for communicating information through a plurality of overlay networks comprising a plurality of node devices connected to a network, the information communication system comprising a first information processing device that comprises:
a first processor; and
a first memory configured to store a first program which, when executed by said first processor, causes the first information processing device to:
receive a request message indicative of requesting information for joining in at least one of the plurality of overlay networks from a request node device that requests to join-in at least one of the plurality of overlay networks,
acquire range information indicative of a range of the network of the request node device,
generate one or more identification information indicative of identifying one or more specific overlay networks corresponding to the range information transmitted by the request node, among the plurality of overlay networks, and
transmit to the request node device the generated identification information for joining-in the one or more specific overlay networks corresponding to the one or more identification information.

2. The information communication system according to claim 1, wherein the first information processing device is at least any one of the plurality of node devices.

3. The information communication system according to claim 1, wherein, the first program further causes the first information processing device to
transmit the generated identification information to the request node device;
wherein, the request node further comprises:
a second processor which causes the request node to:
transmit the request message to the first information processing device;
receive the identification information transmitted from the first information processing device; and
store an address information of the node device which join in the overlay network corresponding to the received identification information and the received identification information corresponding to each other in a second memory.

4. The information communication system according to claim 3, further comprising a second information processing device that can communicate with the node device, the second information processing device comprising:
a third processor; and
a third memory configured to store (1) an address information of the node device joining in at least one of the plurality of overlay networks, (2) the identification information corresponding to each other, and (3) a third program which, when executed by the third processor, causes the second information processing device to:
receive a join-in message including the identification information, and the join-in message transmitted from the request node device; and
transmit to the request node device that has transmitted the identification information, a response message including the address information stored in the third memory corresponding to the received identification information.

5. The information communication system according to claim 4, wherein
The second program further causes the request node to:
transmit to the second information processing device, the join-in message including the generated identification information,
receive the response message transmitted from the second information processing device, and the address information transmitted from the second information processing device, and
store the received address information and the received identification information corresponding to each other in the second memory.

6. The information communication system according to claim 5, wherein the transmitting the join-in message including the generated identification information comprises periodically transmitting to the second information processing device, the join-in message including the generated identification information.

7. The information communication system according to claim 4, wherein the second information processing device is at least any one of the node device that manages information of the group identified by the identification information.

8. The information communication system according to claim 1, wherein,
the acquiring the range information comprises acquiring as the range information the address information assigned by a communication devise which relays the information transmitted and received among the network.

9. The information communication system according to claim 1, wherein,
the acquiring the range information comprises acquiring a domain information indicative of a domain to which the node device belongs, as the range information.

10. The information communication system according to claim 1, wherein,
the acquiring the range information comprises acquiring a plurality of the range information indicative of a plurality of the ranges of the network the request node device can connect,
generating the one or more of the identification information comprises generating a plurality of the identification information corresponding to the plurality of the range information;
wherein the transmitting the request to the request node device comprises transmitting the request node device to join-in the overlay networks corresponding to the plurality of the identification information; and
the first program further causes the first information processing device to switch the overlay network for communicating the information based on a predetermined condition.

11. A first information processing device configured to connect to an information communication system for communicating information through a plurality of overlay networks comprising a plurality of node devices configured to be connected to a network, the first information processing device comprising:
a first processor; and
a first memory configured to store a first program which, when executed by the first processor, causes the first information processing device to:
receive a request message indicative of requesting information for participating at least one of the plurality of the overlay networks from a request node device that requests join-in at least one of the plurality of the overlay network, acquire range information indicative of a range of the network of the request node device, generate one or more of identification information indicative of identifying among the plurality of overlay networks, one or more specific overlay networks corresponding to the range information transmitted by the request node, and a control unit configured to transmit to the request node device, a request to join-in the one or more specific overlay networks corresponding to the one or more identification information.

12. A method for processing information in an information communication system for communicating information through a plurality of overlay networks comprising a plurality of node devices configured to be connected to a network, the information communication system comprising a first information processing device, the method comprising:

receiving, by the first information device a request message indicative of requesting information for participating at least one of the plurality of the overlay networks from a request node device that requests join-in at least one of the plurality of the overlay network, acquiring, by the first information device, range information indicative of a range of the network of the request node device, generating, by the first information device, one or more identification information indicative of identifying, among the plurality of overlay networks, one or more specific overlay networks corresponding to the range information transmitted by the request node, and transmitting, by the first information device, to the request node device, a request to join-in the one or more specific overlay networks corresponding to the one or more of the identification information.

13. A non-transitory computer readable storage medium storing a program that causes a first information processing device configured to connect to an information communication system for communicating information through a plurality of overlay networks comprising a plurality of node devices connected to a network, to execute the steps of:

receiving a request message indicative of requesting information for participating at least one of the plurality of the overlay networks from a request node device that requests join-in at least one of the plurality of the overlay network, acquiring range information indicative of a range of the network of the request node device, generating one or more identification information indicative of identifying among the plurality of overlay networks, one or more specific overlay networks corresponding to the range information transmitted b the request node, and transmitting to the request node device, a request to join-in the one or more of specific overlay network corresponding to the one or more of identification information.

* * * * *